United States Patent
Glaesemann et al.

(10) Patent No.: US 10,851,945 B2
(45) Date of Patent: Dec. 1, 2020

(54) DAMAGE RESISTANT INDICATOR COATING

(71) Applicant: HEXAGON TECHNOLOGY AS, Alesund (NO)

(72) Inventors: William E. Glaesemann, Lincoln, NE (US); Joseph M. Gabriel, Adams, NE (US); Derek Anton Johnson, Lincoln, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 601 days.

(21) Appl. No.: 15/477,183

(22) Filed: Apr. 3, 2017

(65) Prior Publication Data

US 2017/0292655 A1  Oct. 12, 2017

Related U.S. Application Data

(60) Provisional application No. 62/318,942, filed on Apr. 6, 2016.

(51) Int. Cl.
*F17C 13/02* (2006.01)
*B32B 5/00* (2006.01)
(Continued)

(52) U.S. Cl.
CPC .............. *F17C 13/025* (2013.01); *B32B 5/00* (2013.01); *B32B 15/00* (2013.01); *G01D 7/005* (2013.01);
(Continued)

(58) Field of Classification Search
CPC .................................................. F17C 13/025
(Continued)

(56) References Cited

U.S. PATENT DOCUMENTS 1,962,168 A   6/1934   Andrus
3,922,999 A   12/1975  Meginnis
(Continued)

FOREIGN PATENT DOCUMENTS

CN   101687257 A   3/2010
CN   103373005 A   10/2013
(Continued)

OTHER PUBLICATIONS

International Search Report and Written Opinion dated Jul. 25, 2017 for International Application No. PCT/US2017/025494.
(Continued)

*Primary Examiner* — Walter L Lindsay, Jr.
*Assistant Examiner* — Philipmarcus T Fadul
(74) *Attorney, Agent, or Firm* — Mai-Tram D. Lauer; Westman, Champlin & Koehler, P.A.

(57) ABSTRACT

A pressure vessel for holding fluids includes a tank and a coating disposed on an outer surface of the tank. The tank defines a cavity for holding fluids, and an outer surface of the tank includes a first visual characteristic. The coating includes an indicator layer, an outer layer, and a first intermediate layer. The indicator layer is disposed on the outer surface, the indicator layer including a second visual characteristic that visually contrasts with the first visual characteristic. The outer layer is disposed over the indicator layer, the outer layer including a third visual characteristic that visually contrasts with the second visual characteristic. The first intermediate layer is positioned between the indicator layer and the outer layer, the first intermediate layer being visually transparent or translucent. The disclosure also describes a coating including an indicator layer, an outer layer, and a first intermediate layer.

17 Claims, 6 Drawing Sheets

(51) Int. Cl.
  *B32B 15/00* (2006.01)
  *G01D 7/00* (2006.01)

(52) U.S. Cl.
  CPC ...... *B05D 2201/00* (2013.01); *B05D 2202/00* (2013.01); *B05D 2203/00* (2013.01); *B05D 2451/00* (2013.01); *B05D 2490/00* (2013.01); *B05D 2701/00* (2013.01); *B32B 2307/00* (2013.01); *F17C 13/02* (2013.01); *F17C 2201/00* (2013.01); *F17C 2203/0607* (2013.01); *F17C 2203/0692* (2013.01); *F17C 2223/0123* (2013.01)

(58) Field of Classification Search
  USPC .......................................................... 116/220
  See application file for complete search history.

(56) References Cited

U.S. PATENT DOCUMENTS

| | | | |
|---|---|---|---|
| 4,165,002 | A | 8/1979 | Meagher |
| 4,474,217 | A | 10/1984 | DeMarse |
| 5,228,478 | A * | 7/1993 | Kleisle ................... F16L 57/06 |
| | | | 116/208 |
| 5,690,146 | A | 11/1997 | Stammen |
| 7,631,666 | B1 | 12/2009 | Ng |
| 8,739,612 | B2 | 6/2014 | Kawano |
| 2006/0046063 | A1 | 3/2006 | Tippett |
| 2007/0119363 | A1 | 5/2007 | Neto |
| 2007/0228760 | A1 | 10/2007 | Cramaro |
| 2013/0284296 | A1 | 10/2013 | Berger |
| 2015/0345688 | A1 | 12/2015 | Kersey et al. |
| 2016/0010802 | A1 * | 1/2016 | Leavitt ................. F17C 13/003 |
| | | | 250/459.1 |

FOREIGN PATENT DOCUMENTS

| | | |
|---|---|---|
| CN | 204387687 U | 6/2015 |
| FR | 3025584 A1 | 3/2016 |
| RU | 2469819 C2 | 12/2012 |
| RU | 2495323 C2 | 10/2013 |
| WO | 2013137964 A2 | 9/2013 |
| WO | 2016038257 A1 | 3/2016 |

OTHER PUBLICATIONS

Russian Office Action dated Dec. 13, 2019, for corresponding Russian Patent Application No. 2018138389/05 (063832), filed Mar. 31, 2017.

Chinese Office Action for corresponding Chinese Patent Application No. 2017800213599, dated Apr. 17, 2020.

Indian Examination Report dated Jul. 15, 2020, for corresponding Indian Patent Application No. 201847039945, filed Oct. 23, 2018.

* cited by examiner

DAMAGE RESISTANT INDICATOR COATING

CROSS REFERENCE TO RELATED APPLICATION

This application claims the benefit of priority of U.S. Provisional Patent Application No. 62/318,942, filed on Apr. 6, 2016, entitled "Damage Resistant Indicator Coating," the disclosure of which is fully incorporated herein by reference.

BACKGROUND

Pressure vessels are commonly used for containing a variety of fluids under pressure, such as hydrogen, oxygen, natural gas, nitrogen, propane, methane, and other fuels, for example. Generally, pressure vessels can be of any size or configuration. The vessels can be heavy or light, single-use (e.g., disposable, reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. The composite construction of the vessels provides numerous advantages such as lightness in weight and resistance to corrosion, fatigue and catastrophic failure. These attributes are due to the high specific strengths of the reinforcing fibers or filaments. In this case, "composite" means a fiber reinforced resin matrix material, such as a filament wound or laminated structure.

A polymeric or other non-metallic resilient liner or bladder is often disposed within the composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, the liner 20 is formed of blow molded high density polyethylene (HDPE).

FIG. 1 illustrates an elongated pressure vessel 10, such as that disclosed in U.S. Pat. No. 5,476,189, entitled "Pressure vessel with damage mitigating system," which is hereby incorporated by reference. Vessel 10 is generally a tank defining a cavity for holding fluids and has in some embodiments a main body section 12 and substantially hemispherical or dome-shaped end sections 14. A boss 16, typically constructed of aluminum, is provided at one or both ends of the vessel 10 to provide a port for communicating with the interior of the vessel 10. As shown in FIG. 2, vessel 10 may be formed with an inner liner 20 covered by a shell 18. In an example, the shell 18 can be a filament-wound composite shell. In such cases, the composite shell 18 resolves structural loads on the vessel 10.

FIG. 2 illustrates a partial cross-sectional view, taken along line 2-2 of FIG. 1, of a typical end section 14 including a composite shell 18 liner 20 and a boss 16, such as that disclosed in U.S. Pat. No. 5,429,845, entitled "Boss for a filament wound pressure vessel," which is hereby incorporated by reference. The boss 16 typically has a neck 22, a port 26 allowing fluid communication with the interior of vessel 10, and an annular flange 24 extending radially from port 26. Boss 16 is fit to outer shell 18 and liner 20 such that port 26 extends between the interior and exterior of pressure vessel 10. Typically, shell 18 abuts neck 22, and flange 24 is sandwiched between the liner 20 and the shell 18. This construction secures the boss 16 to the vessel 10 and provides a seal at the interfaces between the boss 16, shell 18, and liner 20.

A method of forming a pressure vessel 10 includes mounting a boss on a mandrel and allowing a fluid polymer material for liner 20 to flow around flange 24 of boss 16. The liner material then solidifies; liner 20 is thereby mechanically interlocked with boss 16. Accordingly, even under extreme pressure conditions, separation of liner 20 from boss 16 is prevented.

In an exemplary embodiment, outer shell 18 is formed from wound fibers and surrounds the liner 20 and at least a portion of flange 24 of boss 16. In an exemplary method, a dispensing head for the fibers moves in such a way as to wrap the fiber on the liner 20 in a desired pattern. If the vessel 10 is cylindrical, rather than spherical, fiber winding is normally applied in both a substantially longitudinal (helical) and circumferential (hoop) wrap pattern. This winding process is defined by a number of factors, such as resin content, fiber configuration, winding tension, and the pattern of the wrap in relation to the axis of the liner 20. Details relevant to the formation of an exemplary pressure vessel are disclosed in U.S. Pat. No. 4,838,971, entitled "Filament Winding Process and Apparatus," which is incorporated herein by reference.

Composite pressure vessels are increasingly being used for general commercial and transport applications, such as, for example, fuel storage (e.g., natural gas or hydrogen) in passenger and commercial vehicles, hydraulic systems, and large-scale gas transportation. Use of pressure vessels in these and other uncontrolled environments increases the potential that a vessel be dropped, scraped, subjected to impact, or otherwise damaged. Such damage may not be readily apparent upon visual examination of the vessel, but may be severe enough to render the vessel unfit for continued use. Alternatively, damage to the shell 18 may be visible, but the severity of the damage may not be able to be determined through visual inspection. In other words, an operator may see damage, such as a scrape or dent, on the shell 18 and remove the vessel from service when the damage is not severe enough to render the vessel unfit for use. Approaches to preventing damage to a vessel include adding protective layers, materials, coatings, end caps, or other sacrificial pieces to the exterior of the vessel. However, no approach is able to entirely prevent damage to a vessel, so there exists a need for a visual indication of the existence and severity of vessel damage.

SUMMARY

In one aspect, a pressure vessel for holding fluids is disclosed, the vessel including a tank and a coating disposed on an outer surface of the tank. The tank defines a cavity for holding fluids, and an outer surface of the tank includes a first visual characteristic. The coating includes an indicator layer, an outer layer, and a first intermediate layer. The indicator layer is disposed on the outer surface, the indicator layer including a second visual characteristic that visually contrasts with the first visual characteristic. The outer layer is disposed over the indicator layer, the outer layer including a third visual characteristic that visually contrasts with the second visual characteristic. The first intermediate layer is positioned between the indicator layer and the outer layer, the first intermediate layer being visually transparent or translucent.

In another aspect, the disclosure describes a coating configured for application to a substrate including a first visual characteristic. The coating includes an indicator layer, an outer layer, and a first intermediate layer. The indicator layer is disposed on the substrate, the indicator layer including a second visual characteristic that visually contrasts with the first visual characteristic. The outer layer is disposed over the indicator layer, the outer layer including a third visual characteristic that visually contrasts with the second visual characteristic. The first intermediate layer is positioned between the indicator layer and the outer layer, the first intermediate layer being visually transparent or translucent.

This disclosure, in its various combinations, either in apparatus or method form, may also be characterized by the following listing of items:

1. A pressure vessel for holding fluids, the vessel including:
   a tank defining a cavity for holding fluids, an outer surface of the tank including a first visual characteristic; and
   a coating disposed on the outer surface, the coating including:
      an indicator layer disposed on the outer surface, the indicator layer including a second visual characteristic that visually contrasts with the first visual characteristic;
      an outer layer disposed over the indicator layer, the outer layer including a third visual characteristic that visually contrasts with the second visual characteristic; and
      a first intermediate layer positioned between the indicator layer and the outer layer, the first intermediate layer being visually transparent or translucent.
2. The pressure vessel of item 1, wherein the coating further includes a second intermediate layer between the indicator layer and the outer layer.
3. The pressure vessel of item 2, wherein at least one of the indicator layer, outer layer, first intermediate layer or second intermediate layer includes a collapsible foam.
4. The pressure vessel of any of items 2-3, wherein the second intermediate layer includes a fourth visual characteristic that visually contrasts with at least one of the first, second and third visual characteristics.
5. The pressure vessel of any of items 1-4, wherein at least one of the indicator layer, outer layer, and first intermediate layer includes a collapsible foam.
6. The pressure vessel of any of items 1-5, wherein the first intermediate layer is thicker than a combined thickness of the indicator layer and the outer layer.
7. The pressure vessel of any of items 1-6, wherein at least one of the indicator layer, outer layer, and first intermediate layer includes a UV-curable material.
8. The pressure vessel of any of items 1-7, wherein at least one of the first visual characteristic, the second visual characteristic and the third visual characteristic includes color.
9. A coating configured for application to a substrate including a first visual characteristic, the coating including:
   an indicator layer disposed on the substrate, the indicator layer including a second visual characteristic that visually contrasts with the first visual characteristic;
   an outer layer disposed over the indicator layer, the outer layer including a third visual characteristic that visually contrasts with the second visual characteristic; and
   a first intermediate layer positioned between the indicator layer and the outer layer, the first intermediate layer being visually transparent or translucent.
10. The coating of item 9, further including a second intermediate layer between the indicator layer and the outer layer.
11. The coating of item 10, wherein at least one of the indicator layer, outer layer, first intermediate layer or second intermediate layer includes a collapsible foam.
12. The coating of any of items 10-11, wherein the second intermediate layer includes a fourth visual characteristic that visually contrasts with at least one of the first, second and third visual characteristics.
13. The coating of any of items 9-12, wherein at least one of the indicator layer, outer layer, and first intermediate layer includes a collapsible foam.
14. The coating of any of items 9-13, wherein the first intermediate layer is thicker than a combined thickness of the indicator layer and the outer layer.
15. The coating of any of items 9-14, wherein at least one of the indicator layer, outer layer, and first intermediate layer includes a UV-curable material.
16. The coating of any of items 9-15, wherein at least one of the first visual characteristic, the second visual characteristic and the third visual characteristic includes color.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure describes various embodiments of a protective multilayer for a pressure vessel that provides a visual indication that the coating has been damaged. Additionally, the coating provides a visual indication of the severity of the damage so that an operator may keep a vessel in service if the damage does not render the vessel unfit for use. An operator may remove a vessel from service if damage to the vessel compromises the effective use of the vessel. Damage such as a scrape, scratch, or gouge exposes at least one inner layer of the multilayer coating, which provides a visual indicator of the severity of the damage. In exemplary embodiments, the visual indicator may be due to contrasting visual characteristics between layers of the coating, including contrasting colors, differing reflectivity properties, or differing refraction properties, for example. Additionally, an exemplary embodiment of the coating acts to protect the pressure vessel against damage such as, for example, abrasion and impacts.

Figure 1:
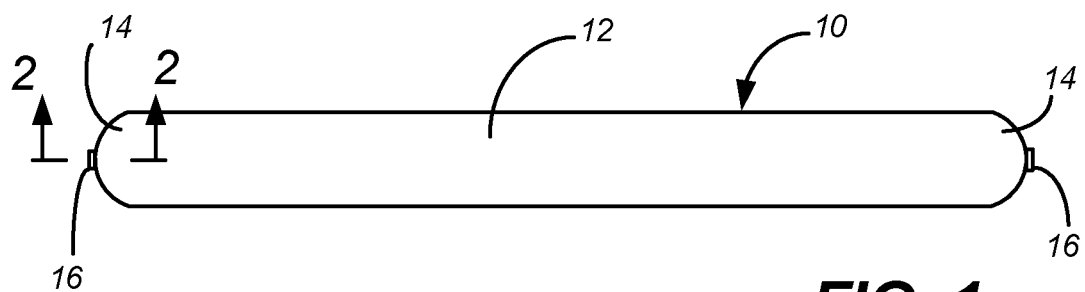
FIG. 1 shows a side view of a typical pressure vessel.
Figure 2:
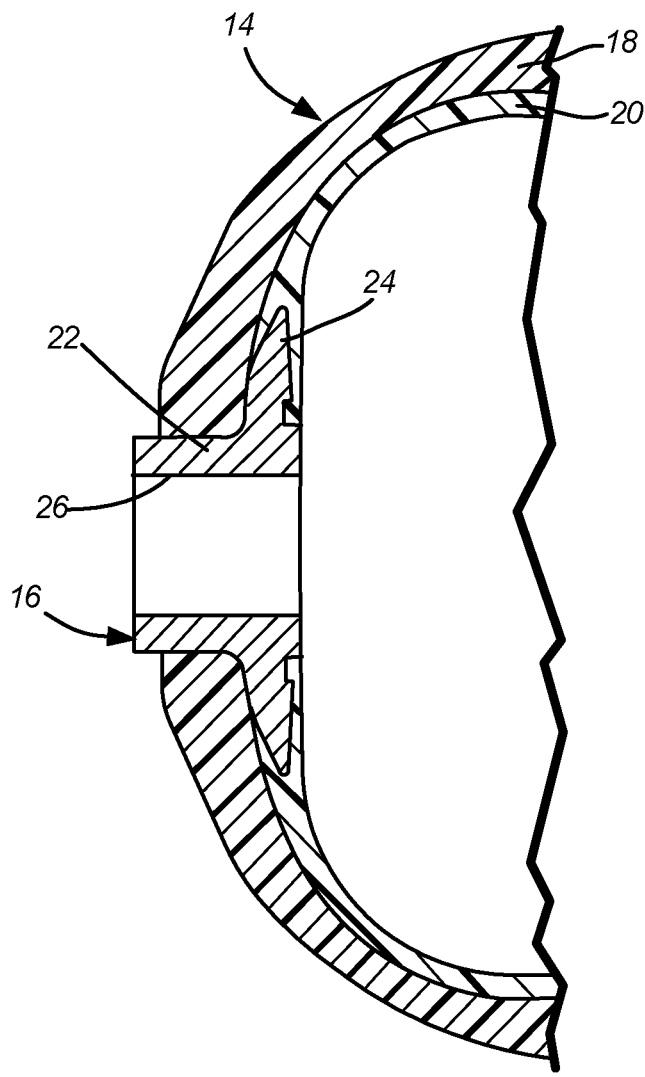
FIG. 2 is a partial cross-sectional view of one end of the vessel of FIG. 1 taken along line 2-2 of FIG. 1 and showing a typical shell, boss, and liner.
Figure 3:
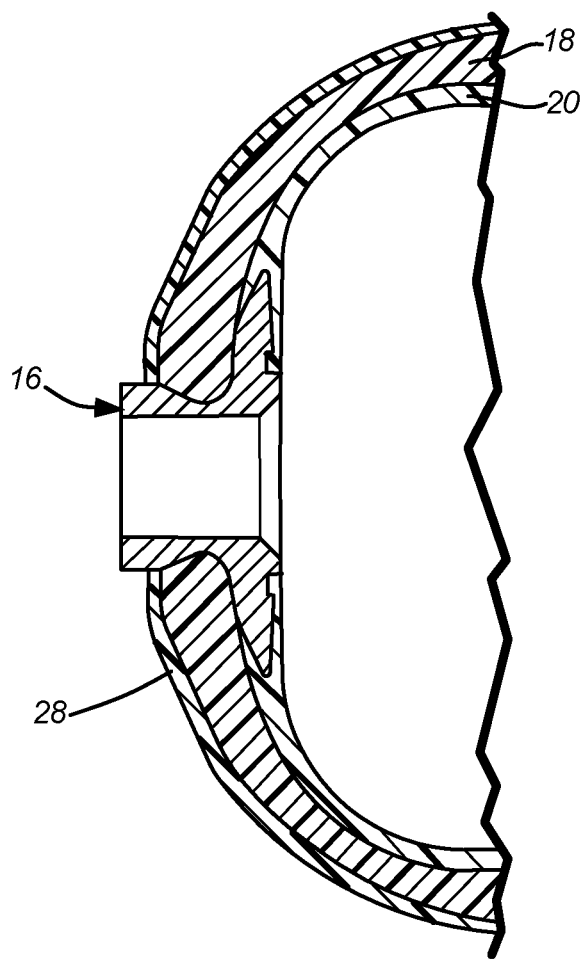
FIG. 3 is a partial cross-sectional view of an exemplary embodiment of a pressure vessel including a protective multilayer coating of the present disclosure.

FIG. 3 shows an exemplary embodiment of a multi-layer indicator coating 28 on shell 18. In some embodiments, coating 28 is an ultraviolet (UV)-curable coating, with one or more layers thereof provided in a form such as a UV-curable liquid or powder. However, coating 28 may be of any material or type that exhibits properties such as adherence to a substrate such as shell 18 (on its own or via an intermediate binding layer, not shown), abrasion and impact resistance, and color retention to allow for visual perception of damage to vessel 10, for example. FIGS. 4-8, 9 and 10 are enlarged partial cross-sectional views of exemplary embodiments of a portion of the pressure vessel and protective multilayer coating of FIG. 3, oriented so that an inside of the pressure vessel is shown on the left and the outside of the pressure vessel is shown on the right. While these are cross-sectional views, cross-hatching of the components of indicator coating 28 have been omitted for clarity of illustration.

Figure 4:
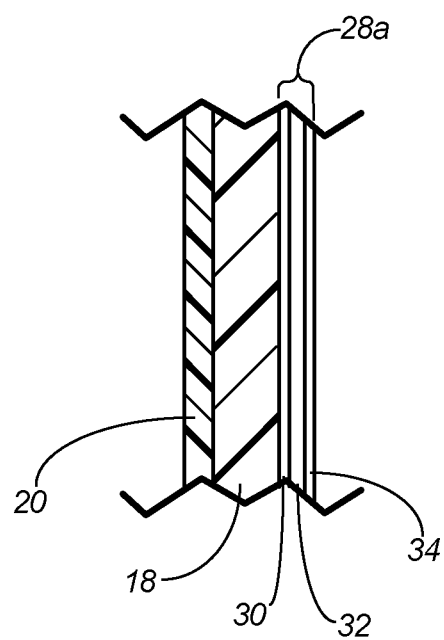
FIG. 4 is an enlarged partial cross-sectional view of a portion of the pressure vessel and protective multilayer coating of FIG. 3, oriented so that an inside of the pressure vessel is shown on the left and the outside of the pressure vessel is shown on the right.

FIG. 4 shows an enlarged partial cross-section of an exemplary coating 28a on a pressure vessel having shell 18 and liner 20. In an exemplary embodiment, coating 28a includes an indicator layer 30 disposed on shell 18, a middle or intermediate layer 32 disposed on indicator layer 30, and an outer layer 34 on middle layer 32. Thus, middle layer 32 is positioned intermediate indicator layer 30 and outer layer 34. In exemplary embodiments of coating 28, respective coating layers 30, 32, 34 adhere to each other on their own or via one or more intermediate binding layers, not shown.

In an exemplary embodiment, any of the layers of multiple-layer coating 28 includes a material that can be applied to an underlying vessel shell 18 or an underlying layer. Suitable materials include urethane, polyurethane, epoxy, acrylic, and compressible and/or collapsible foams, for example. Particularly suitable materials are curable by ultraviolet (UV) radiation. The use of UV curable materials can decrease the time needed for coating and curing the various layers of multiple-layer coating 28, compared to materials that require more curing time. The specific compositions of the materials of any of the layers of multiple-layer coating 28 can be tailored to provide desired adhesion and environmental resistance properties such as temperature and moisture resistance, fade resistance, strength, abrasion resistance, and impact resistance, for example.

In the illustrated embodiment, indicator layer 30 is disposed on shell 18. In an exemplary embodiment, indicator layer 30 is a UV-curable paint of a color that contrasts with the color of shell 18 so that shell 18 is readily visually discernable from indicator layer 30. For example, if shell 18 is black, a suitable color for indicator layer 30 may be gold, red, orange, or a neon color. However, any contrasting colors are suitable for adjacent layers of multiple-layer coating 28. Indicator layer 30 is applied to shell 18 by rolling, spraying, brushing, flow coating or any useful application method. In an exemplary embodiment, indicator layer 30 is applied in two coats to a total thickness of between and including about 0.003 inch (0.076 mm) and about 0.006 inch (0.152 mm) to provide adequate coverage of shell 18 and visually present a solid (as opposed to translucent or uneven) color to a user. In other embodiments, indicator layer 30 may be applied in any number of coats of any thickness, so long as the layer is readily visible when portions of the middle and/or outer layers 32, 34 are removed.

In an exemplary embodiment, middle layer 32 is a substantially transparent or translucent UV-curable coating applied onto indicator layer 30, and through which the color of indicator layer 30 can be seen. When middle layer 32 in an exemplary embodiment is visually transparent or translucent, middle layer 32 does not serve as a visual damage indicator alone. Rather, its primary role is as a protective layer, accepting gouges, scratches, and other damage and preventing the damage from reaching indicator layer 30 or shell 18. Moreover, when middle layer 32 is transparent or translucent, it provides an early indication of damage, as indicator layer 30 can be viewed through the transparent middle layer 32 when merely outer layer 34 has been included, even if middle layer 32 is essentially intact.

Middle layer 32 is applied to indicator layer 30 by rolling, spraying, brushing, flow coating, or any useful application method. In some embodiments, middle layer 32 is thicker than a combined thickness of indicator layer 30 and outer layer 34. In an exemplary embodiment, middle layer 32 has a thickness of between and including about 0.015 inch (0.381 mm) and about 0.035 inch (0.889 mm). In some embodiments, middle layer 32 may make up about 90% of the total thickness of multi-layer coating 28. In an exemplary embodiment, middle layer 32 may be made of a material that can absorb impact forces, thereby providing additional damage resistance. The material may be a flexible or collapsible foam, and may be a polyurethane foam, for example.

In an exemplary embodiment, outer layer 34 is a UV-curable material in the form of a paint of a color that contrasts with the color of indicator layer 30 so that indicator and outer layers 30, 34 can be readily discerned from each other. Outer layer 34 adheres to middle layer 32 and to any layer(s) that may be added to outer layer 34, such as, for example, base layers onto which labelling may be adhered or otherwise attached. Outer layer 34 is applied to middle layer 32 by rolling, spraying, brushing, flow coating, or any useful application method. In an exemplary embodiment, outer layer 34 is applied in two or three coats to a thickness of between and including about 0.003 inch (0.076 mm) and about 0.006 inch (0.152 mm). In other embodiments, outer layer 34 may be applied in any number of coats of any thickness. In vessels 10 having a thicker outer layer 34, deeper gouges may be made in multi-layer coating 28 without breaking through to the middle layer 32 to expose indicator layer 30 to view.

Figure 5:
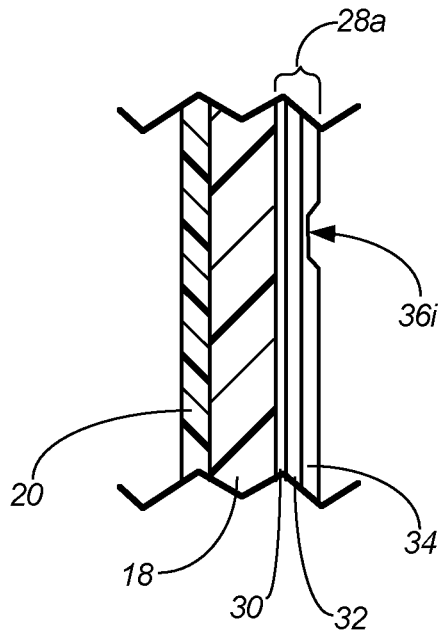
FIG. 5 is similar to FIG. 4 but includes a gouge wherein a portion of the coating has been removed to expose an intermediate, transparent layer.

FIGS. 4-8A show a first exemplary embodiment of multi-layer coating 28. FIG. 4 shows an exemplary embodiment of an undamaged multi-layer coating 28a on vessel 10. In each respective FIG. 5-8, a gouge 36 of a different depth has caused damage of differing levels of severity. This disclosure refers to a "gouge" to describe any scrape, scratch, flaw, abrasion, crack or other feature that breaks the outer surface of coating 28. FIG. 5 shows that multi-layer coating 28a has been subjected to minor damage by gouge 36i that is not severe enough to compromise the use of vessel 10. In FIG. 5, the damage to outer layer 34 has caused a gouge 36i that does not extend through outer layer 34 to middle layer 32. Only the color of the outer layer 34 is visible, indicating that vessel 10 is fit for use.

Figure 6:
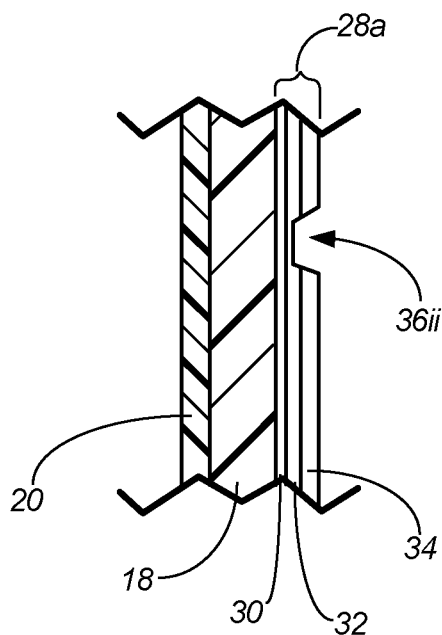
FIG. 6 is similar to FIG. 5 but includes a deeper gouge wherein a portion of a middle, transparent layer of the coating has been removed, thereby making a bottom indicator layer viewable through the transparent layer.
Figure 7:
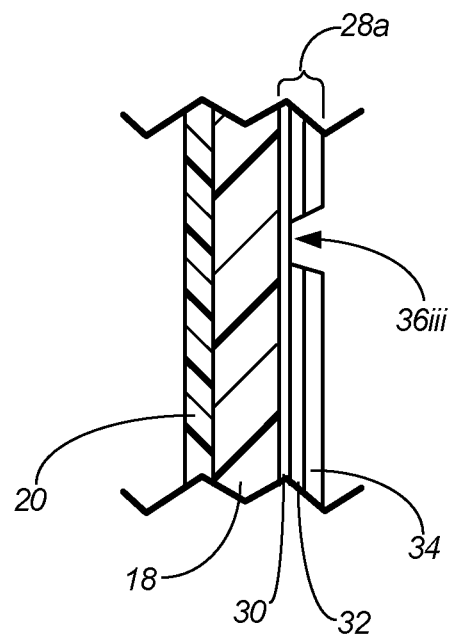
FIG. 7 is similar to FIG. 6 but shows a still deeper gouge wherein the entire thickness of a middle, transparent layer of a portion of the coating has been removed, thereby exposing a bottom indicator layer of the coating.

In FIGS. 6 and 7, the gouge 36ii, 36iii does not extend through the entire thickness of multilayer coating 28. Instead, in FIG. 6, gouge 36ii extends partially into middle layer 32 so that indicator layer 30 can be seen through transparent (or translucent) middle layer 32. In FIG. 7, gouge 36iii extends through middle layer 32, thereby exposing indicator layer 30. In both FIGS. 6 and 7, the visibility of the color of indicator layer 30 (visible either directly as in FIG. 7 or indirectly through middle layer 32 as in FIG. 6) indicates that vessel 10 has been subjected to damage such as an impact or abrasion but may not be damaged to the extent that use of vessel 10 is contraindicated. Vessel 10 may be inspected at the site of damage during, for example, routine maintenance instead of being immediately removed from service.

Figure 8:
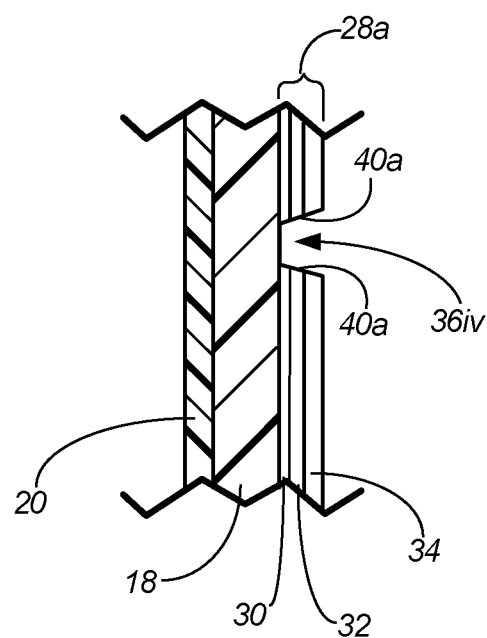
FIG. 8 is similar to FIG. 7 buts shows yet a deeper gouge, wherein the gouge has removed the entire thickness of the coating, thereby exposing a shell of the pressure vessel.
Figure 8A:
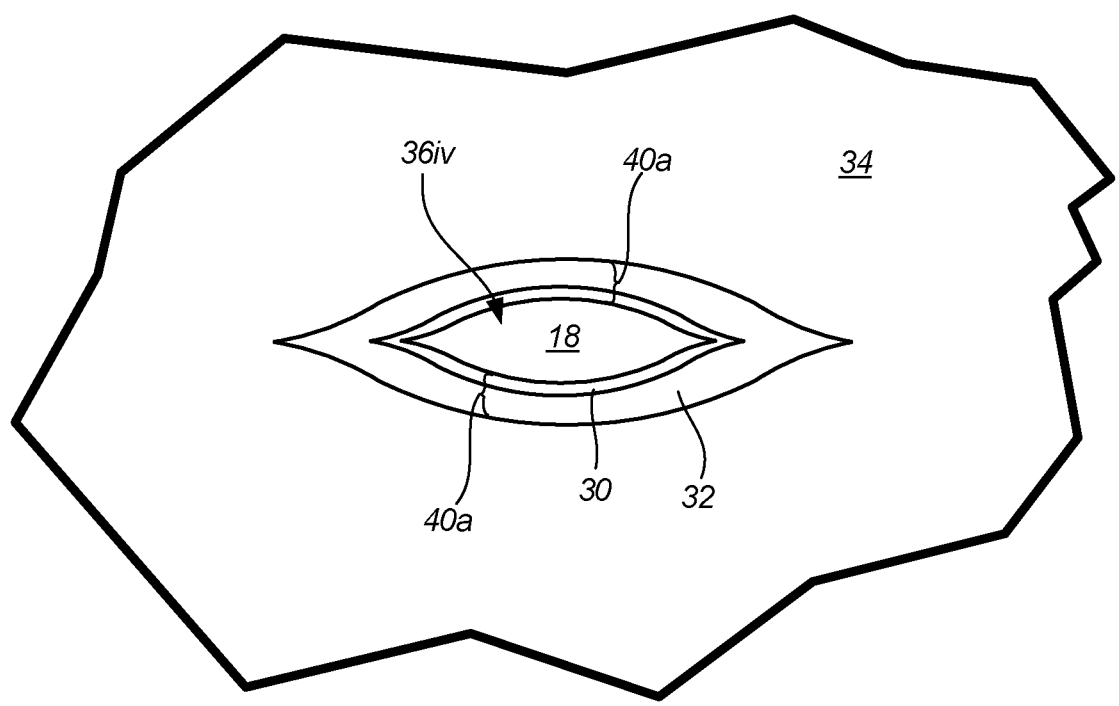
FIG. 8A is a view from the right side of FIG. 8 of a portion of the pressure vessel with the protective coating of FIG. 4, wherein the gouge has removed the entire thickness of the coating, thereby exposing a shell of the pressure vessel.

In FIGS. 8 and 8A, damage has caused a gouge 36iv that has removed the total thickness of a portion of multi-layer coating 28a. Shell 18 of vessel 10 is exposed to view, indicating that severe damage has occurred and in some cases that vessel 10 is ready for removal from service or other corrective action. In this case, at least a portion of the gouge 36iv is the color of shell 18, this portion being surrounded by a portion of the gouge 36 that is the color of the indicator layer 30, which in an exemplary embodiment visually contrasts with the color of shell 18. When middle layer 32 is transparent, the portions of walls 40a through middle layer 32 and indicator layer 30 appear to be the color of indicator layer 30, and the demarcation between the layers 30, 32 is not readily discernable. In an exemplary embodiment, the color of outer layer 34 visually contrasts with the color of indicator layer 30.

The relative sizes and shapes of the colored portions revealed by a gouge or flaw depend on the size and shape of the gouge, and on the angles of the gouge walls 40 relative to the exterior surface of shell 18. Reference number 36 refers to a gouge of any configuration, while 36i refers to the configuration of a gouge shown in FIG. 5; 36ii refers to the configuration of a gouge shown in FIG. 6; 36iii refers to the configuration of a gouge shown in FIG. 7; 36iv refers to the configuration of a gouge shown in FIGS. 8 and 8A; and 36c refers to the configuration of a gouge shown in FIG. 10. Reference number 40 refers to gouge walls of any configuration, while 40a refers to the configuration of gouge walls shown in FIGS. 8 and 8A; 40c refers to the configuration of gouge walls in FIG. 10.

As apparent in FIGS. 8 and 8A, gouge walls 40 oriented nearly perpendicularly to the shell 18 reveal little of the indicator color of layer 30, while gouges with walls 40 oriented relatively obliquely to the shell 18 will reveal more of the indicator color. Relatively wide gouges 36 with gently-sloping walls are characterized by relatively large portions of indicator layer 30 being visible around the exposed portion of shell 18. Gouges 36 with steeply-sloping walls are characterized by relatively small or narrow portions of indicator layer 30 being visible around the exposed portion of shell 18. The appearance of the exposed layers allows for a rough determination of the size, shape, type, and/or severity of the damage to vessel 10. In an exemplary embodiment, the outer layer 34, indicator layer 30, and shell 18 all have mutually contrasting colors. In that case, even if gouge walls 40 are steep (and even undercut), the gouge 36iv may be visually perceived by the detection of the color of shell 18, which contrasts with the color of outer layer 34, even if the color of indicator layer 30 is not easily seen.

The total thickness of multilayer coating 28 may be theoretically or experimentally derived. An exemplary thickness of multilayer coating 28 is inclusive and between about 0.010 inch (0.254 mm) and about 0.100 inch (2.540 mm). The total thickness of multi-layer coating 28, the thickness of each layer, the color of each layer, and the protective characteristics of each layer can be chosen and calibrated to provide the desired indications. For example, the composition and structure of multi-layer coating 28 may be selected so that visible exposure of shell 18 indicates the lowest severity of damage that is likely to render a vessel 10 unsuitable for operation, but the composition and structure of multi-layer coating 28 may be chosen to indicate any level of damage useful for a given application.

For instance, in applications requiring response to slight vessel damage, the total thickness of multi-layer coating 28 may be chosen to be small, such that a relatively shallow gouge 36 removes a total thickness of a portion of coating 28, indicating that vessel 10 be removed from service or otherwise attended to after relatively light damage. Alternatively, in applications requiring response to slight vessel 10 damage, the total thickness of multi-layer coating 28 may be chosen to be large, while the thickness of outer layer 34 is chosen to be small. A relatively shallow gouge 36, such as gouge 36ii of FIG. 6 removes a section of outer layer 34, thereby revealing the color of indicator layer 30 through transparent middle layer 32. A user may remove the vessel 10 from service or attend to the vessel 10 at that point, after relatively light damage. Thus, the multi-layer coating 28 can be used in a manner that offers an early indication of damage while at least some layers or portions of multi-layer coating 28 are still intact to offer continued damage protection.

In an exemplary embodiment, at least some layers of multi-layer coating 28 serve not only as visual indicators, but also function to protect shell 18 against abrasions, scuffs, minor impacts, and the like. As such, for a given material, a thinner coating 28 or respective layer provides less protection. In any case, the relative thicknesses of the respective layers may be chosen with regard to the materials used for the layers and the requirements of the vessel 10 application.

Figure 9:
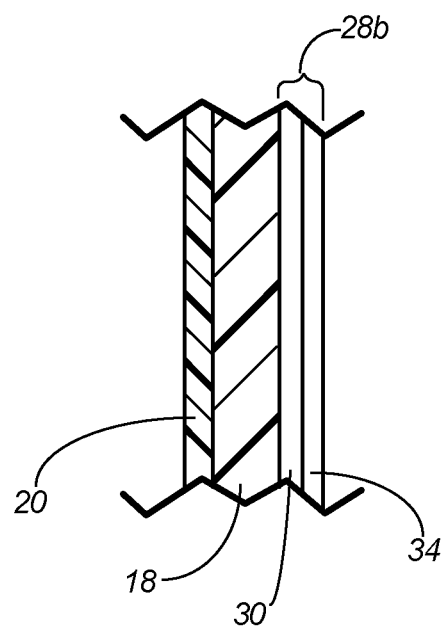
FIG. 9 is an enlarged partial cross-sectional view of a pressure vessel and a second exemplary embodiment of a protective multilayer coating of FIG. 3.

FIG. 9 shows an exemplary embodiment of multi-layer coating 28b having no middle layer 32. In this embodiment, outer layer 34 is applied directly onto indicator layer 30, so the removal of a small amount of coating 28b (relative to embodiments in which multi-layer coating 28 includes middle layer 32) indicates that vessel 10 is damaged. In an exemplary embodiment, the total thickness of a coating 28b having no middle layer 32 is between about 0.010 inches and about 0.015 inches. The coating 28b with no middle layer 32 renders an indicator that is sensitive to damage, in that small abrasions or impacts are indicated as damage. Such a coating 28b is cost efficient and light-weight because of the reduced use of coating materials compared to thicker coatings.

Figure 10:
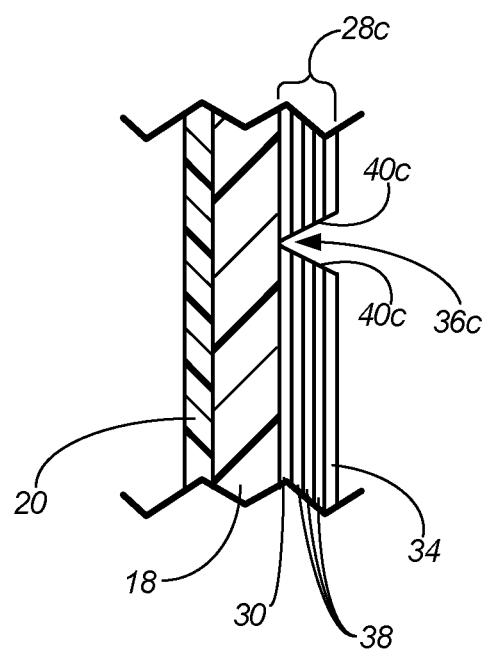
FIG. 10 is an enlarged partial cross-sectional view of a pressure vessel and a third exemplary embodiment of a protective multilayer coating including several intermediate layers.

FIG. 10 shows an exemplary embodiment of multi-layer coating 28c on a vessel 10 having several intermediate indicator layers 38 between indicator layer 30 and outer layer 34. Individual intermediate indicator layers 38 may have different colors, may be transparent/translucent, or a combination of colored and clear layers 38. A gouge 36c in coating 28c exposes indicator layers along the walls 40c of the gouge 36c so that the depth of the gouge 36c may be determined by, for instance, counting the number of exposed layers or by noting the color of the deepest exposed layer, where each layer has a known thickness. In an exemplary embodiment, shell 18 has a first color, for example, black. Indicator layer 30 has a second color that contrasts with the first color, for example gold. Outer layer 34 has a third color that contrasts with both the first and second colors, for example red. At least one of intermediate layers 38 is substantially clear. And at least one of intermediate layers 38 has a fourth color that contrasts with both the first, second, and third, colors—for example, green. While this example uses different colors for each layer, it is also contemplated that fewer colors may be used, as long as contrasting colors are used in adjacent layers.

Moreover, the structure of multi-layer coating 28c may place colored layers 30, 38 at known, discrete depth measurements from outer layer 34. Thus, exposure of a particular color readily alerts a user to the depth of gouge 36c. Multiple intermediate indicator layers 38 may also be used to determine the topographical characteristics of a gouge 36, in an embodiment where all areas of a given color exposed on the gouge 36 walls are at substantially the same depth from outer layer 34.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. A pressure vessel for holding fluids, the vessel including:
    a tank defining a cavity for holding fluids, an outer surface of the tank including a first visual characteristic; and
    a coating disposed on the outer surface, the coating including:
        an indicator layer disposed on the outer surface, the indicator layer including a second visual characteristic that visually contrasts with the first visual characteristic;
        an outer layer disposed over the indicator layer, the outer layer including a third visual characteristic that visually contrasts with the second visual characteristic; and
        a first intermediate layer positioned between the indicator layer and the outer layer, the first intermediate layer being visually transparent or translucent.

2. The pressure vessel of claim 1, wherein the coating further includes a second intermediate layer between the indicator layer and the outer layer.

3. The pressure vessel of claim 2, wherein at least one of the indicator layer, outer layer, first intermediate layer or second intermediate layer includes a collapsible foam.

4. The pressure vessel of claim 2, wherein the second intermediate layer includes a fourth visual characteristic that visually contrasts with at least one of the first, second and third visual characteristics.

5. The pressure vessel of claim 1, wherein at least one of the indicator layer, outer layer, and first intermediate layer includes a collapsible foam.

6. The pressure vessel of claim 1, wherein the first intermediate layer is thicker than a combined thickness of the indicator layer and the outer layer.

7. The pressure vessel of claim 1, wherein at least one of the indicator layer, outer layer, and first intermediate layer includes a UV-curable material.

8. The pressure vessel of claim 1, wherein at least one of the first visual characteristic, the second visual characteristic and the third visual characteristic includes color.

9. The pressure vessel of claim 1, wherein the tank comprises a liner disposed within a composite shell, and wherein the outer surface of the tank is an outer surface of the composite shell.

10. A coating configured for application to a substrate including a first visual characteristic, the coating including:
    an indicator layer disposed on the substrate, the indicator layer including a second visual characteristic that visually contrasts with the first visual characteristic;
    an outer layer disposed over the indicator layer, the outer layer including a third visual characteristic that visually contrasts with the second visual characteristic; and
    a first intermediate layer positioned between the indicator layer and the outer layer, the first intermediate layer being visually transparent or translucent.

11. The coating of claim 10, further including a second intermediate layer between the indicator layer and the outer layer.

12. The coating of claim 11, wherein at least one of the indicator layer, outer layer, first intermediate layer or second intermediate layer includes a collapsible foam.

13. The coating of claim 11, wherein the second intermediate layer includes a fourth visual characteristic that visually contrasts with at least one of the first, second and third visual characteristics.

14. The coating of claim 10, wherein at least one of the indicator layer, outer layer, and first intermediate layer includes a collapsible foam.

15. The coating of claim 10, wherein the first intermediate layer is thicker than a combined thickness of the indicator layer and the outer layer.

16. The coating of claim 10, wherein at least one of the indicator layer, outer layer, and first intermediate layer includes a UV-curable material.

17. The coating of claim 10, wherein at least one of the first visual characteristic, the second visual characteristic and the third visual characteristic includes color.

* * * * *